Oct. 7, 1969    A. A. R. SAYIGH    3,471,543
SEQUENTIAL PRODUCTION OF POLYISOCYANATE COMPOSITIONS
Filed July 8, 1965    2 Sheets-Sheet 1

INVENTOR.
A.A.R. SAYIGH
BY Dennis A Lith
AGENT

United States Patent Office 3,471,543
Patented Oct. 7, 1969

3,471,543
SEQUENTIAL PRODUCTION OF POLYISO-
CYANATE COMPOSITIONS
Adnan A. R. Sayigh, North Haven, Conn., assignor to The
Upjohn Company, Kalamazoo, Mich., a corporation of
Delaware
Filed July 8, 1965, Ser. No. 470,400
Int. Cl. C07c *119/04*
U.S. Cl. 260—453                                    15 Claims

ABSTRACT OF THE DISCLOSURE

A mixture of polymethylene polyphenyl isocyanates containing from 65% to 75% of methylenebis(phenyl isocyanate), obtained by phosgenation of the corresponding mixture of polyamines (derived by aniline-formaldehyde condensation), is partially distilled in a thin film evaporator to yield methylenebis(phenyl isocyanate) as volatile overhead and polymethylene polyphenyl isocyanates, containing 45% to 60% methylenebis(phenyl isocyanate), as undistilled bottoms. The distribution of polymeric components in the latter is substantially unaffected by the distillation in contrast to results achieved in batch distillation. The process can be used as the end step in continuous production of the above two polymethylene polyphenyl isocyanate mixtures as well as methylenebis (phenyl isocyanate), and confers flexibility of operation on commercial production of these materials.

---

This invention relates to novel processes for the preparation of isocyanates and is more particularly concerned with an improved process for the preparation of methylenebis(phenylisocyanate) and of polyisocyanates related thereto.

Methylenebis(phenylisocyanate) is widely used, particularly in the formation of cellular and non-cellular polyurethanes, and is available commercially in a variety of forms. For example, substantially pure 4,4'-methylenebis(phenylisocyanate) is available for use in the formation of fibre grade polyurethane elastomers. A mixture of 4,4'-methylenebis(phenylisocyanate) and the corresponding 2,4'-isomer, generally containing approximately 90% by weight of the former and about 10% by weight of the latter, is available for use in the preparation of polyurethanes of various types. Mixtures of polyisocyanates containing about 45 to about 60% of methylenebis (phenylisocyanates), the remainder of said mixture being polymethylene polyphenyl isocyanates of functionality higher than 2.0, are widely used in the preparation of rigid and semi-rigid cellular polyurethanes. Typical of such mixtures is that containing approximately 50% by weight of methylenebis(phenylisocyanate) the remainder of said mixture being polymethylene polyphenyl isocyanates of functionality higher than 2.0. More recently a mixture of polyisocyanates containing approximately 70% by weight of methylenebis(phenylisocyanate) the remainder of said composition being polymethylene polyphenyl isocyanates of functionality higher than 2.0 has become available for use in the preparation of various types of polyurethane, particularly flexible and semi-rigid cellular polyurethanes.

The process conventionally employed in the preparation of methylenebis(phenylisocyanate), i.e. pure 4,4'-isomer or mixtures of 2,4'-isomer and 4,4'-isomer free from polyisocyanates of higher functionality, normally comprises phosgenating the corresponding methylene dianiline. The latter is conventionally obtained by condensation of aniline and formaldehyde in the presence of a mineral acid, usually hydrochloric acid. The methylenedianiline can be purified before phosgenation, or, in a particular variation of the process, the crude reaction product containing the methylenedianiline, obtained by condensation of formaldehyde and aniline, is phosgenated and the desired methylenebis(phenylisocyanate) is isolated by distillation from the phosgenation product. Such processes are generally conducted in a batch operation designed to produce methylenebis(phenylisocyanate) and any by-products formed are held to a minimum and discarded. Typical of the above type of procedure is that described in U.S. Patent 3,163,666.

The present invention provides for the first time a process adapted to produce at least three different, commercially useful, forms of methylenebis(phenylisocyanate) using an essentially continuous procedure, said procedure being capable of easy modification to meet fluctuating market demands for one or more of the products, and, at the same time, leading to considerable economic advantages.

In its broadest aspect the present invention comprises a multi-step process in which (a) A mixture of polyisocyanates containing from about 65% to about 75% by weight of methylenebis (phenylisocyanate), the remainder of said mixture being polymethylene polyphenyl isocyanates of functionality higher than 2.0, is produced by phosgenating the mixture of polyamines obtained by condensing approximately 4.0 molar proportions of aniline with from about 1.4 to about 1.75 molar proportions of formaldehyde in the presence of hydrochloric acid, and (b) Said mixture of polyisocyanates is subjected to partial distillation to remove as overhead methylenebis (phenylisocyanate) and to leave as undistilled residue a mixture of polyisocyanates containing from about 45% to about 60% by weight of methylenebis(phenylisocyanate) the remainder of said mixture being polymethylene polyphenyl isocyanates of functionality higher than 2.0.

The various aspects and representative specific embodiments of said process will be discussed in more detail hereafter. It is apparent that the above process is capable of yielding, in one operation, any or all of the following three products:

(a) A mixture of polyisocyanates containing from about 65 to about 75% of methylenebis(phenylisocyanate), the remainder of said mixture being polymethylene polyphenyl isocyanates of functionality higher than 2.0, said mixture being produced as the product of stage (a) of the process of the invention outlined above;

(b) A mixture of polyisocyanates containing from about 45 to about 60% of methylenebis(phenyl isocyanate), the remainder of said mixture being polymethylene polyphenyl isocyanates of functionality higher than 2.0 and (c) Methylenebis(phenylisocyanate) substantially free from polyisocyanates having a functionality higher than 2.0.

The latter compound, i.e. methylenebis(phenylisocyanate), is normally obtained in the process of the invention in the form of the 4,4'-isomer containing a minor proportion of the 2,4'-isomer. The proportion of the latter isomer present in the mixture is generally of the order of about 8 to 10% but the precise proportion can be varied by adjusting the conditions employed in the later stages of the process of the invention as will be discussed more fully hereinafter.

In addition to the production of the above three products as a direct result of the process of the invention the methylenebis(phenylisocyanate) produced by the process of the invention can be subjected to fractional distillation, and like conventional isomer separation techniques, to yield substantially pure 4,4'-methylenebis(phenylisocyanate) which is required, for example, in the preparation of high grade polyurethane fibers and the like.

The initial stage of the process of the invention, namely the production of a mixture of polyisocyanates containing from about 65% to about 75% by weight of methylenebis(phenylisocyanate), the remainder of said mixture being polyisocyanates of functionality higher than 2.0, is carried out by conventional techniques, the feature which is critical to the production of the desired content of methylenebis(phenylisocyanate) being the molar proportion of aniline to formaldehyde employed in producing the mixture of polyamines from which the polyisocyanate mixture is prepared by phosgenation. Use of a molar proportion of aniline to formaldehyde of the order of about 4.0 to 1.75 will give a polyamine which on phosgenation will give the desired mixture of polyisocyanates containing approximately 65% of methylenebis(phenylisocyanate). The use of a molar ratio of aniline to formaldehyde of approximately 2:1.4 will give the corresponding mixture of polyisocyanates containing approximately 75% of methylenebis(phenylisocyanate). In order to produce polyisocyanates with a methylenebis(phenylisocyanate) content intermediate between the above limits it is merely necessary to make the appropriate adjustment of the aniline to formaldehyde ratio used in preparing the intermediate polyamine.

Illustrative of the reaction conditions which can be employed in carrying out the preparation of the above polyisocyanate mixtures by condensation of aniline and formaldehyde in the presence of hydrochloric acid followed by phosgenation of the resulting polyamines are those described by D'Ancicco et al. Canadian Patent 700,026, and Abbotson et al. U.S. Patent 2,950,263. For example, the aniline and formaldehyde in the proportions set forth above are brought together with the hydrochloric acid in any convenient manner. Advantageously, but not necessarily, the mixture of acid and formaldehyde is added to the aniline using appropriate mixing means and procedures.

The admixture of the reactants is an exothermic process and it is generally desirable to remove at least part of the heat generated in the mixing step so that the temperature of the reaction mixture does not exceed a value of the order of about 80° C. to about 100° C. This can be done in a batch-type process by applying cooling to the vessel in which the mixing is carried out or, in a continuous type of operation, by passing the stream of reactants, immediately after mixing, through a suitable heat exchanger.

The temperature at which the condensation of formaldehyde and aniline is carried out can be varied within wide limits. Generally speaking temperatures within the range of about 10° C. to about 105° C. can be employed but temperatures within the range of about 60° C. to about 95° C. are preferred. If desired the initial mixing of the reactants can be carried out at temperatures in the lower of the broad range and the reaction can be heated subsequently to a temperature at the higher end of the range. The reaction time is a function of the reaction temperature; in the case of reactions carried out within the indicated preferred temperature range a reaction time of the order of 1 to 4 or more hours is appropriate.

The reaction product so obtained is then neutralized, for example using aqueous alkali such as aqueous sodium hydroxide solution and the organic layer is separated, washed with water, if desired, and treated, for example, by partial distillation, to remove unreacted aniline.

The mixture of polyamines so produced contains of the order of about 65% to about 75% methylene dianilines, depending upon initial proportions of aniline to formaldehyde, the remainder of said mixture being polymethylene polyanilines of functionality higher than 2.0. This mixture of polyamines is then dissolved in an inert solvent, which solvent is one which is not reactive with phosgene, and is preferably one which has a boiling point lower than the methylenebis(phenylisocyanate). Suitable such solvents include toluene, xylene, chlorobenzene, o-dichlorobenzene, and the like. Chlorobenzene is a preferred solvent.

The amount of solvent employed can be varied within wide limits. The proportion of solvent to mixture of polyamines employed is determined in practice on the basis of the minimum amount of solvent necessary to dissolve the polyamine and to reduce the viscosity of the polyamine mixture to a level at which it can be handled readily in the phosgenation stage. In general it is advantageous to employ of the order of about 3 parts of solvent to about 1 part of polyamine mixture though higher or lower proportions can be used depending upon the particular solvent employed.

The phosgenation of the polyamine solution is carried out using conventional procedures such as described in the references cited above and also those disclosed by Siefkin, Annalen, 562, 85, 1948. The phosgene, either in gaseous form or in the form of a solution in an inert solvent such as those exemplified above, is brought into contact with the polyamine solution using appropriate mixing procedures. For example, in a batch type procedure the phosgene and polyamine solution are brought together in a suitable vessel equipped with stirrer, heating means, cooling means, and the like. In a continuous type procedure the phosgene and polyamine solution are fed as separate streams into a mixing zone in which the reactant streams are intimately intermingled in suitable proportions.

Whichever method of mixing is adopted the operation can be carried out at normal ambient temperatures (of the order of 25° C.) or the reactants can be preheated to a temperature approaching the desired reaction temperature before mixing. In general, the reaction is carried out by bringing the reactants together at a temperature within the range of about 0° C. to about 125° C. and subsequently raising the temperature of the reaction mixture to a value within the range of about 150° C. to 200° C. The time for which the reaction mixture is held at temperatures within the above ranges is a function of the actual temperatures themselves and of the adequacy of the mixing conditions employed. In a batch type process it is frequently necessary to employ reaction times of the order of several hours in order to ensure high yields of the desired isocyanate. Where a continuous process is employed, with high efficiency of mixing of reactants, a much shorter reaction time is found to be satisfactory. The end point of the reaction can be determined by observing the point at which evolution of hydrogen chloride, eliminated in the reaction, ceases.

The solution of polyisocyanates obtained in the above process is then treated to remove the inert solvent together with any excess phosgene, monoisocyanate (i.e. phenylisocyanate produced by phosgenation of residual aniline in the starting mixture of polyamines) and hydrogen chloride.

The stripping of the solvent is accomplished by conventional techniques using any suitable evaporators, for example rising film and falling film evaporators, cyclone separators and the like, at atmospheric pressure or under reduced pressure, if desired. When operating on a small scale the inert solvent can be removed by distillation in a batch type operation but when operating on a larger scale such a procedure results in unduly long exposure of the polyisocyanate to temperatures which can result in transformation and/or degradation of the components of the isocyanate mixture.

Using the various procedures outlined above for condensation of aniline and formaldehyde and phosgenation of the resulting polyamines, and employing aniline and formaldehyde in the stated proportions in the first stage, there is obtained a mixture of polyisocyanates which mixture contains from about 65% to about 75% methylenebis(phenylisocyanate). This material is itself useful commercially as an intermediate in the production of polyurethanes particularly in the preparation of flexible and semi-flexible foams using procedures well-known in the art; see, for example, Saunders et al., Polyurethanes, Chemistry and Technology, Part II, Interscience Publishers, New York, 1964.

The above material is also useful using the processes to be described below, as an intermediate in the simultaneous preparation of methylenebis(phenylisocyanate) and a mixture of polyisocyanates having a content of methylenebis(phenylisocyanate) of the order of about 45% to about 60% by weight. Thus it will be seen that the present invention provides, inter alia, a method of meeting fluctuating market demands for any of the above three products. The rate and scale of production of the intermediate 65% to 75% methylenebis(phenylisocyanate) content material can be so adjusted that sufficient of the latter is produced to meet not only the market demand for this composition as such but also to provide, using the processes to be described below, sufficient of the pure methylenebis(phenylisocyanate) and of the 45% to 60% methylenebis(phenylisocyanate) content material to meet the demands for these compositions also. The economic advantages attendant upon these interrelated procedures will be obvious to one skilled in the art.

The conversion of the polyisocyanate containing 65% to 75% methylenebis(phenylisocyanate) to give pure methylenebis(phenylisocyanate) as the one product and polyisocyanate containing 45% to 60% methylenebis(phenylisocyanate) as the second product is accomplished using procedures which involve removal of part of the methylenebis(phenylisocyanate) as volatile overhead under conditions which do not affect adversely, either by degradation, polymerization or like changes, the composition of the polyisocyanate mixture from which the overhead is removed. Various specific embodiments of this conversion will now be discussed. It is to be understood that these embodiments are illustrative and are not limiting. Various modifications and variations of the procedures to be illustrated will be obvious to those skilled in the art and it is to be understood that the invention is not limited to the procedures of said specific embodiments.

Figure 1:
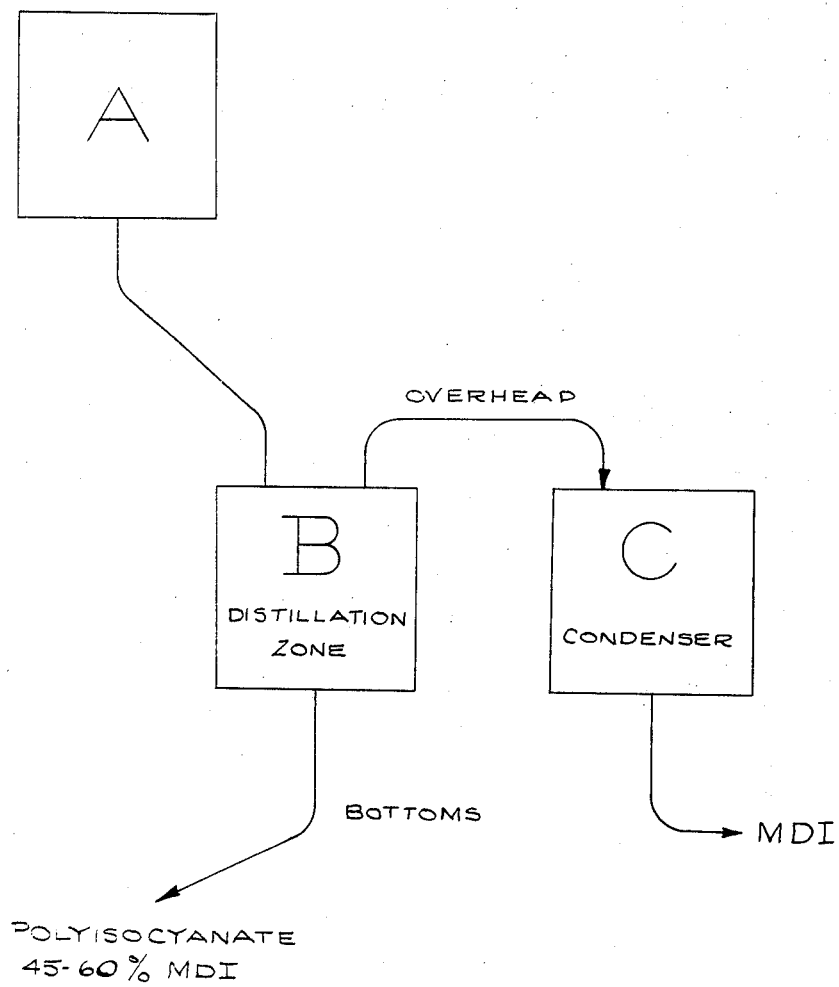
FIGURE 1 is a schematic representation of the sequence of the steps and the apparatus employed in a representative specific embodiment of the process of the invention subsequent to production of the 65% to 75% methylenebis(phenyl)isocyanate containing material.

In FIGURE 1, zone A is a storage tank or like vessel, zone B is a distillation zone from which the undistilled material is removed as bottoms fraction ("Polyisocyanate 45–55% MDI") and from which the volatile fraction ("Overhead") is removed via suitable piping and the like to zone C which is a condenser zone wherein the product ("MDI") is collected.

Figure 2:
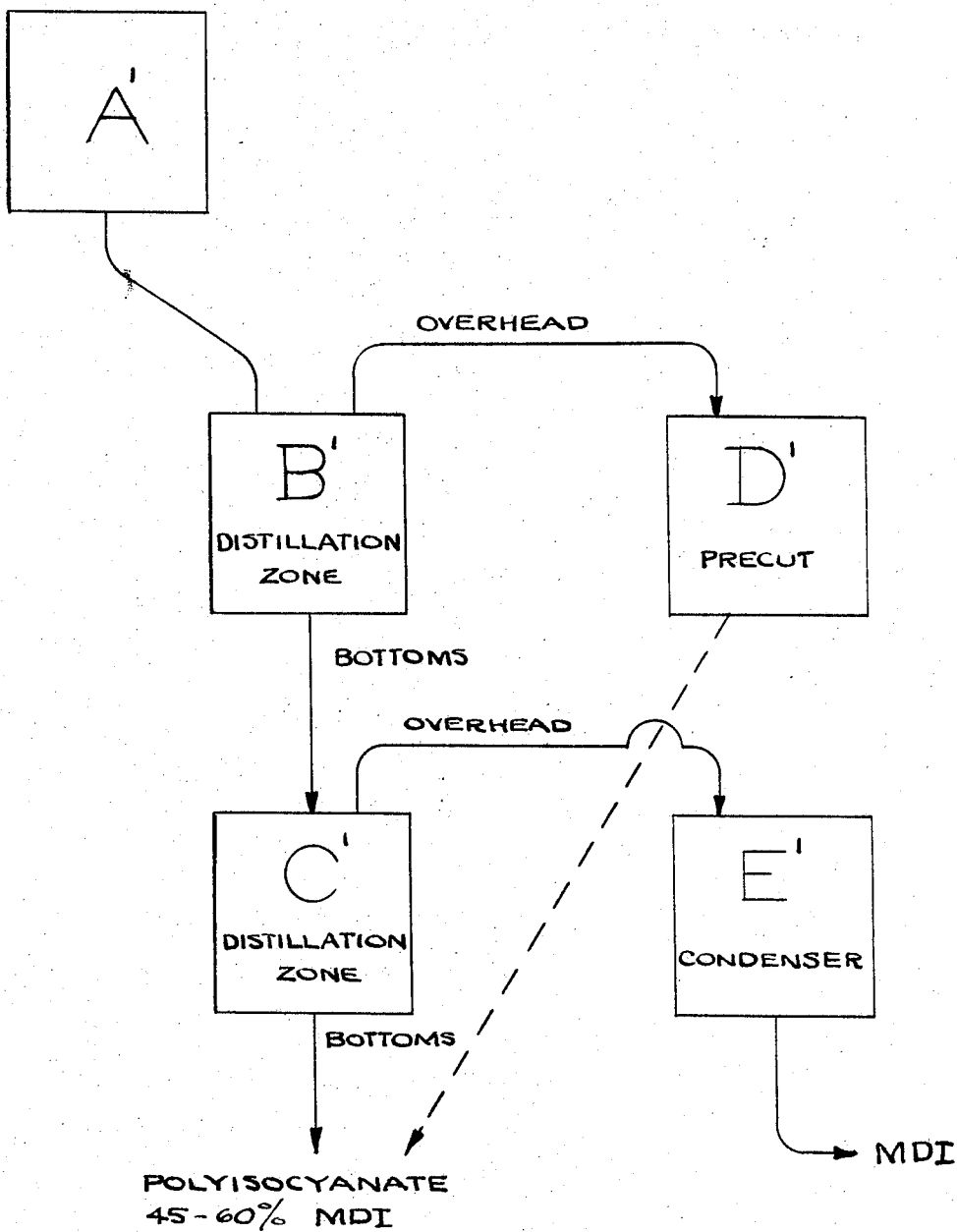
FIGURE 2 is a schematic representation of the sequence of the steps and the apparatus employed in a second representative specific embodiment of the process of the invention subsequent to production of the 65% to 75% methylenebis(phenyl)isocyanate containing material.

In FIGURE 2, zone A' is a storage tank or like vessel, zone B' is a distillation zone from which volatile material is removed and condensed in zone D' which is a condenser unit, zone C' is a second distillation zone to which undistilled material from the first distillation zone B' is transferred, and zone E' is a condenser unit zone in which volatile material removed from the second distillation zone C' is condensed.

Referring now to the illustrative specific embodiment shown schematically in FIGURE 1, the polyisocyanate with 65% to 75% methylenebis(phenylisocyanate) content [hereinafter called "feed polyisocyanate"] is passed from the storage zone A which is a storage tank or the like vessel or, alternatively and preferably is the vessel in which the final solvent stripping is carried out, to the distillation zone B. In this latter zone B the feed polyisocyanate is subjected to partial distillation under vacuum under conditions such that a portion of the methylenebis(phenyl isocyanate) is removed as overhead and the undistilled portion of the feed is removed as bottoms fraction, the residence time of this fraction in the distillation zone B being sufficiently short to prevent any substantial chemical change, such as degradation, polymerization and the like, in said fraction.

For this purpose any of the distillation units known in the art for the distillation of heat sensitive materials under a pressure lower than about 10 mm. of mercury can be employed in distillation zone B. Such distillation units including climbing thin film evaporators, falling thin film evaporators, spinning disc film evaporators, horizontal and vertical wiped film evaporators, and the like. Illustrative of the stills of the above types are those shown in U.S. Patents 2,890,155, 2,927,634, 2,993,842, 3,020,211, and 3,060,107.

In the above types of still the feed is caused to flow as a thin film through a heating zone in which the rate of heat transfer is very high. The more volatile component of the feed is removed as overhead and the undistilled portion of the feed is removed from a suitable point in the still, the overall residence time of the feed in the still being kept as short as possible.

The temperature and pressure maintained in the still in distillation zone B varies depending upon the particular still used. In general the temperature to which the feed polyisocyanate is subjected is of the order of 160° C. to about 200° C. and the pressure is of the order of about 0.5 to 2.0 mm. of mercury. While these ranges of temperature and pressure are the most advantageous it will be understood that higher or lower temperatures can be employed depending upon the particular still employed and the degree of vacuum which can be maintained therein.

The rate at which the feed polyisocyanate is fed to the distillation zone B is adjusted so that, at any particular combination of temperature and pressure in the still, a total of from about 12.5% to about 54.5% by weight of the feed polyisocyanate is removed as volatile overhead. The precise proportion of methylenebis(phenylisocyanate) removed depends upon the initial content of methylenebis(phenylisocyanate) in the feed polyisocyanate and the desired content in the undistilled bottoms fraction. The above limits represent the extremes. Thus, where the feed polyisocyanate contains the higher level of about 75% methylenebis(phenylisocyanate) it is necessary to remove 54% by weight of the feed polyisocyanate to obtain the lowest desired content (about 45%) in the undistilled bottoms fraction. Similarly, when the feed polyisocyanate contains the lower limit (about 65%) of methylenebis(phenylisocyanate) and it is desired to obtain an undistilled bottoms fraction containing the higher limit of methylenebis(phenylisocyanate) [about 60%] it is only necessary to remove 12.5% by weight of the feed polyisocyanate as overhead. The precise amount of methylenebis(phenylisocyanate) to be removed in any particular case can be calculated readily.

If desired, the removal of the calculated proportion of methylenebis(phenylisocyanate) as overhead can be accomplished in a single pass through the still. However, it is often found desirable, in order to ensure a sufficiently low residence time of polyisocyanate in the still, to accomplish the removal of the desired proportion of methylenebis(phenylisocyanate) in a total of two or more passes. In such instances the bottoms fraction from the first run, and any subsequent intermediate passes, can be returned directly to the feed zone A for repassage through the distillation zone B, or, alternatively, can be retained in a suitable holding vessel for subsequent repassage through the distillation zone B.

By removing, in or more passes through the distillation zone B, the appropriate proportion of the methylenebis(phenylisocyanate), within the limits set forth above, as volatile overhead, there is finally recovered as the bottoms fraction a mixture of polyisocyanates containing from about 45% to about 60% of methylenebis(phenylisocyanate), the remainder of said mixture comprising polymethylene polyphenyl isocyanates having a functionality greater than 2.0. This mixture of polyisocyanates finds particular commercial application in the preparation of rigid polyurethane foams using the procedures described for example in Canadian Patent 700,026.

The methylenebis(phenylisocyanate) removed as overhead in the distillation zone B is condensed in the condenser zone C. The material so obtained is a mixture comprising about 87% to about 96% of 4,4'-methylene-bis-(phenylisocyanate) and from about 13% to about 4% of 2,4' - methylenebis(phenylisocyanate). This material is useful as such in the preparation of polyurethanes by procedures well-known in the art. In order to produce methylenebis(phenylisocyanate) having different proportions of 4,4'-isomer and 2,4'-isomer the material obtained as described above is subjected to further treatment. For example, said material is subjected to a fractional distillation. The first portion of distillate is much richer in the more volatile 2,4'-isomer than is the distilland. By collecting the first 1% to 3% of distillate, which is richer in the 2,4'-isomer and then separately collecting the remainder of the distillate there is obtained the bulk of the methylenebis(phenylisocyanate) as a mixture having a higher content of 4,4'-isomer than the original distilland.

Alternatively, by subjecting the methylenebis(phenylisocyanate) collected in the condenser zone C or even more carefully controlled fractional distillation it is possible to obtain substantially pure 4,4'-methylenebis(phenylisocyanate) which material is normally employed in the preparation of special types of polyurethanes, particularly in fiber grade polyurethanes.

In a particular example of a procedure carried out according to the specific embodiment shown schematically in FIGURE 1, a polyisocyanate mixture containing 68% methylenebis(phenylisocyanate), and prepared by condensing aniline and formaldehyde in the molar proportion of 4.0 to 1.6 in the presence of about 2.3 equivalents of hydrochloric acid and phosgenation of the corresponding mixture of polyamines so obtained as described above, was employed as feed polyisocyanate. The distillation apparatus employed in zone B was 20 sq. ft. area wiped film evaporator of the type described in U.S. Patent 2,927,634. The polyisocyanate feed was passed from zone A to the distillation zone B at a rate of 450 lbs. per hour. The still was heated, using hot oil, so that the temperature of the film in said still was approximately 190° C. The still contents were maintained throughout at a pressure of 1.5 mm. of mercury. Methylenebis(phenylisocyanate) was recovered as overhead and condensed in zone C at a rate of 162 lbs. per hour (36% by weight of the feed). A mixture of polyisocyanates containing 50% methylenebis(phenylisocyanate) was recovered as bottoms fraction from the distillation zone B at a rate of 288 lbs. per hour. The methylenebis(phenylisocyanate) condensed in zone C was found to have a content of 4,4'-methylenebis(phenylisocyanate) of 87% by weight the remainder of said material being the corresponding 2,4'-isomer. A total of 750 parts by weight of this material was subjected to distillation at a pressure of 2.5 mm. of mercury in a batch still. The first 4 parts by weight of distillate were found to have a content of 4,4'-methylenebis(phenylisocyanate) of 80 percent. This precut was retained and added to a subsequent batch of methylenebis(phenylisocyanate) prior to distillation. The subsequent bulk of the distillate (646 parts by weight) had a content of 4,4'-methylenebis-(phenylisocyanate) of 90% by weight and a content of 2,4'-methylenebis(phenylisocyanate) of 10% by weight.

A second specific embodiment of a process according to the invention is shown schematically in FIGURE 2. In this embodiment the feed polyisocyanate is fed from zone A' which, as in the previous embodiment, can be a storage tank or like vessel, or, alternatively and preferably can be the vessel in which the final solvent stripping is carried out, to a distillation zone B'. The distillation unit employed in the latter zone can be any of the types of unit suitable for distillation of heat sensitive materials under vacuum which were described above for use in zone B of the previous specific embodiment (FIG. 1). The temperature and pressure limitations employed in the distillation zone B' are the same as those defined above for zone B (FIG. 1). The volatile overhead precut from zone B' is recovered in the condenser zone D'.

The rate of passage of feed polyisocyanate to distillation zone B' is such that the amount of volatile overhead removed and collected in the zone D' is from about 1.0% to about 3.0% by weight of the total feed polyisocyanate, the remainder of said feed being removed from zone B' as an undistilled bottoms fraction. The precut collected in condenser zone D' contains traces of phenyl isocyanate (from phosgenation of traces of aniline in the polyamine starting material) and inert solvent but the bulk of the precut is methylenebis(phenylisocyanate) which is richer in 2,4'-isomer (up to as much as 20% by weight) than the methylenebis(phenylisocyanate) remaining in the bottoms fraction. By regulating the amount of precut taken from distillation zone B' it is thus possible to regulate the proportion of 4,4'-isomer to 2,4'-isomer in the methylenebis(phenylisocyanate) which is retained in the bottoms fraction taken from distillation zone B'. This in turn controls the proportion of the two isomers in the methylenebis(phenylisocyanate) which is recovered as overhead later in the process as will be seen below.

The bottoms fraction from distillation zone B' is then passed as feed to a second distillation zone C'. The still employed in this zone C' can be the same species of still as that employed in the first distillation zone B' or it can be a different species of the same type of still described above as suitable for use in distillation zone B'. The conditions of temperature and pressure maintained in distillation zone C' are within the same limits as those employed in the first distillation zone B' and, preferably, the precise conditions employed in the first zone are employed in the second zone except for the heat input.

The rate of feed of the bottoms from zone B' to the second distillation zone C' is adjusted so that a total of from about 12.5% to about 54.5% by weight of the feed polyisocyanate is removed as volatile overhead either in one single pass through the distillation apparatus or by two or more passes through the apparatus. The precise proportion of methylenebis(phenylisocyanate) removed at this stage depends upon the initial content of methylenebis(phenylisocyanate) in the feed. The above limits represent the extremes; see previous discussion. The removal of the appropriate proportion, within the above limits, of the methylenebis(phenylisocyanate) as overhead leads to the recovery of a bottoms fraction in the form of a mixture of polyisocyanates having a content of methylenebis(phenylisocyanate) of about 45 to 60%, the exact content of the latter material being determined by the exact amount of methylenebis(phenylisocyanate) taken off as overhead in zone C'. Thus, as in the previous embodiment, the composition of the final mixture of polyisocyanates recovered as bottoms fraction can be controlled to whatever extent is desired by regulating the feed rate and other variables in the distillation zone.

The methylenebis(phenylisocyanate) taken off as overhead in distillation zone C' is recovered in condenser zone E'. As discussed above, the proportion of 4,4'-isomer to 2,4'-isomer in this product is dependent upon, and can be controlled by, the amount of precut taken off as overhead in the first distillation zone B'. If desired, the isomeric proportions of the methylenebis(phenylisocyanate) recovered in zone E' can be further modified by fractional distillation as discussed and exemplified above in connection with the specific embodiment of FIGURE 1.

The precut recovered in zone D' of the above process can be discarded or alternatively returned to the feed polyisocyanate in zone A', or in a preferred second alternative, can be used to blend with, and thereby adjust the methylenebis(phenylisocyanate) content of, the polyisocyanate fraction recovered as bottoms from distillation zone C'.

The various products obtained using the process outlined schematically in FIGURE 2 correspond to those obtained as shown in FIGURE 1 and discussed above.

In a particular example of a procedure carried out according to the specific embodiment shown schematically in FIGURE 2, a polyisocyanate mixture containing 68% methylenebis(phenylisocyanate), and prepared by phosgenation of the corresponding mixture of polyamines as described above, was employed as feed polyisocyanate. The distillation apparatus employed in the first distillation zone B' and in the second distillation zone C' was a 20 sq. ft. area wiped film evaporator of the type described in U.S. Patent 2,927,634. The polyisocyanate feed was passed from zone A' to the first distillation zone B' at a rate of 1590 lbs. per hour. The still was heated (hot oil) so that the temperature of the film in said still was 190° C. The still contents were maintained throughout at a pressure of 1.5 mm. of mercury. Overhead (precut) was recovered from distillation zone B' and collected in condenser zone D' at a rate of 48 lbs. per hour. Said precut contained 98% by weight of methylenebis(phenylisocyanate) and had a content of 4,4'-isomer of 86%.

The bottoms fraction from the first distillation zone B' was fed at a rate of 1542 lbs. per hour to a second distillation zone C' maintained under the same conditions of temperature and pressure as the first distillation zone B'. Methylenebis(phenylisocyanate) was removed as volatile overhead from said distillation zone C' at a rate of 556 lbs. per hour (36% by weight of the feed) and was collected in condenser zone E'. The methylenebis(phenylisocyanate) so obtained contained 90% by weight of the 4,4'-isomer and 10% by weight of the 2,4'-isomer.

The bottoms fraction recovered from distillation zone C' at a rate of 986 lbs./hour was a mixture of polyisocyanates containing 47.5% of methylenebis(phenylisocyanate) the remainder of said mixture being polymethylene polyphenyl polyisocyanates of functionality higher than 2.0. The methylenebis(phenylisocyanate) content of this material was subsequently adjusted to 50% by weight by blending in an appropriate quantity of the precut collected in condenser zone D'.

I claim:
1. In a process for the sequential production of three polyisocyanate compositions the combination of steps comprising
    (a) phosgenating a mixture of polyamines, obtained by condensing aniline and formaldehyde in a molar proportion within the range of about 4:1.4 to about 4:1.75 in the presence of hydrochloric acid, thereby producing a mixture of polyisocyanates containing from about 65% to about 75% by weight of methylenebis(phenylisocyanate), the remainder of said mixture being polymethylene polyphenyl isocyanates of functionality higher than 2.0;
    (b) subjecting at least a portion of said mixture of polyisocyanates to partial distillation under vacuum in a thin film evaporator to remove methylenebis (phenylisocyanate) as volatile overhead in an amount from about 12.5% to about 54.5% by weight of said feed polyisocyanate and
    (c) recovering as the undistilled bottoms fraction a mixture of polyisocyanates having a content of from about 45% to about 60% by weight of methylenebis (phenylisocyanate), the remainder of said mixture being polymethylene polyphenyl isocyanates having a functionality higher than 2.0.
2. In a process for the sequential production of three polyisocyanate compositions the combination of steps comprising:
    (a) phosgenating a mixture of polyamines, obtained by condensing aniline and formaldehyde in a molar proportion within the range of from about 4:1.4 to about 4:1.75 in the presence of hydrochloric acid, thereby producing a mixture of polyisocyanates containing from about 65% to about 75% by weight of methylenebis(phenylisocyanate), the remainder of said mixture being polymethylene polyphenyl isocyanates of functionality higher than 2.0;
    (b) subjecting said mixture of polyisocyanates to partial distillation under vacuum using a thin film evaporator to remove therefrom a volatile overhead from about 1% to about 3% by weight of said mixture;
    (c) subjecting the undistilled bottoms fraction from said partial distillation step to a second partial distillation under vacuum using a thin film evaporator to remove methylenebis(phenylisocyanate) as volatile overhead in a total amount of from about 12.5% to about 54.5% by weight of said bottoms fraction employed as feed; and
    (d) recovering as bottoms fraction from said second partial distillation a polyisocyanate composition containing from about 45% to about 60% by weight of methylenebis(phenylisocyanate), the remainder of said composition being polymethylene polyphenyl isocyanates of functionality higher than 2.0.
3. A process for the preparation of polyisocyanate compositions which comprises subjecting a mixture of polymethylene polyphenyl isocyanates containing from about 65% to about 75% by weight of methylenebis (phenylisocyanate), the remainder of said mixture being polymethylene polyphenyl isocyanates of a functionality higher than 2.0, to partial distillation under vacuum in a thin film evaporator, removing methylenebis(phenylisocyanate) as volatile overhead in an amount from about 12.5% to about 54.5% by weight of said feed polyisocyanate, and recovering as the undistilled bottoms fraction a mixture of polyisocyanates having a content of from about 45% to about 60% by weight of methylenebis (phenylisocyanate) the remainder of said mixture being polymethylene polyphenyl isocyanates having a functionality higher than 2.0.
4. The process of claim 3 wherein the thin film evaporator is a wiped film evaporator.
5. The process of claim 3 wherein the partial distillation is carried out at a temperature within the range of about 160° C. to about 200° C. and a pressure of the order of about 0.5 to about 2.0 mm. of mercury.
6. A process for the preparation of polyisocyanate compositions which comprises the steps of
    (a) subjecting a mixture of polymethylene polyphenyl isocyanates containing from about 65 to about 75% by weight of methylenebis(phenylisocyanate), the remainder of said mixture being polymethylene polyphenyl isocyanates of a functionality higher than 2.0, to partial distillation under vacuum in a thin film evaporator to remove thereby from about 1% to about 3% by weight of said feed mixture as a volatile fraction;
    (b) passing the undistilled bottoms fraction from said partial distillation through a second distillation stage in which said bottoms fraction is subjected to partial distillation under vacuum in a thin film evaporator to remove methylenebis(phenylisocyanate) as volatile overhead in a total amount of from about 12.5% to about 54.5% by weight of said bottoms fraction employed as feed; and
    (c) recovering as bottoms fraction from said second partial distillation a polyisocyanate composition containing from about 45% to about 60% by weight of methylenebis(phenylisocyanate), the remainder of said composition being polymethylene polyphenyl isocyanates of functionality higher than 2.0.
7. The process of claim 6 wherein the thin film evaporator is a wiped film evaporator.
8. The process of claim 6 wherein each partial distillation is carried out at a temperature within the range of about 160° C. to about 200° C. and a pressure of the order of about 0.5 to about 2.0 mm. of mercury.

9. A process for the preparation of polyisocyanate compositions which comprises subjecting a mixture of polymethylene polyphenyl isocyanates containing about 68% by weight of methylenebis(phenylisocyanate), the remainder of said mixture being polymethylene polyphenyl isocyanates of a functionality higher than 2.0, to partial distillation under vacuum in a thin film evaporator, removing methylenebis(phenylisocyanate) as volatile overhead in an amount of about 36% by weight of said feed polyisocyanate, and recovering as the undistilled bottoms fraction a mixture of polyisocyanates having a content of about 50% by weight of methylenebis(phenylisocyanate), the remainder of said mixture being polymethylene polyphenyl isocyanates having a functionality higher than 2.0.

10. The process of claim 9 wherein the thin film evaporator is a wiped film evaporator.

11. The process of claim 9 wherein the partial distillation is carried out at a temperature within the range of about 160° C. to about 200° C. and a pressure of the order of about 0.5 to about 2.0 mm. of mercury.

12. A process for the preparation of polyisocyanate compositions which comprises the steps of
   (a) subjecting a mixture of polymethylene polyphenyl isocyanates containing about 68% by weight of methylenebis(phenylisocyanate), the remainder of said mixture being polymethylene polyphenyl isocyanates of a functionality higher than 2.0, to partial distillation under vacuum in a thin film evaporator to remove thereby from about 1% to about 3% by weight of said feed mixture as a volatile fraction;
   (b) passing the undistilled bottoms fraction from said partial distillation through a second distillation stage in which said bottoms fraction is subjected to partial distillation under vacuum in a thin film evaporator to remove methylenebis(phenylisocyanate) as volatile overhead in a total amount of about 36% by weight of said bottoms fraction employed as feed; and
   (c) recovering as bottoms fraction from said second partial distillation as polyisocyanate composition containing about 50% by weight of methylenebis phenylisocyanate), the remainder of said composition being polymethylene polyphenyl isocyanates of functionality of higher than 2.0.

13. The process of claim 12 wherein the thin film evaporator is a wiped film evaporator.

14. The process of claim 12 wherein the partial distillation is carried out at a temperature within the range of about 160° C. to about 200° C. and a pressure of the order of about 0.5 to about 2.0 mm. of mercury.

15. The process of claim 12 wherein the precut obtained in step (a) is blended with the bottoms fraction obtained in step (c) to adjust the methylenebis(phenylisocyanate) content of the latter.

References Cited

UNITED STATES PATENTS

| | | | |
|---|---|---|---|
| 2,683,730 | 7/1954 | Seeger et al. | 260—453 |
| 3,215,652 | 11/1965 | Kaplan | 260—453 X |
| 3,260,751 | 7/1966 | Powers et al. | 260—453 X |
| 3,317,481 | 5/1967 | Youker | 260—453 X |

CHARLES B. PARKER, Primary Examiner

DOLPH H. TORRENCE, Assistant Examiner

U.S. Cl. X.R.

203—72, 80, 89, 91; 260—2.5, 77.5, 570